United States Patent [19]

Chudik

[11] Patent Number: 4,993,088
[45] Date of Patent: Feb. 19, 1991

[54] PORTABLE BED ASSEMBLY FOR MOTOR VEHICLES

[76] Inventor: David Chudik, 329 Douglas Dr., Bloomingdale, Ill. 60108

[21] Appl. No.: 439,163

[22] Filed: Nov. 20, 1989

[51] Int. Cl.⁵ ............................................. A47C 19/12
[52] U.S. Cl. .......................................... 5/118; 296/26; 108/44; 414/522
[58] Field of Search ........................ 108/44, 129, 132; 414/522; 296/26; 5/118

[56] References Cited

U.S. PATENT DOCUMENTS

| | | | |
|---|---|---|---|
| 2,249,845 | 7/1941 | Mitchell | 296/26 |
| 3,006,487 | 10/1961 | Gelli | 414/522 |
| 3,338,620 | 8/1967 | Cauvin | 414/522 X |
| 3,394,666 | 7/1968 | Pearlman | 108/44 X |
| 3,709,159 | 1/1973 | Oglesby, Jr. | 108/44 |
| 3,726,422 | 4/1973 | Zelin | 296/26 X |
| 4,305,695 | 12/1981 | Zarchrich | 414/522 |
| 4,375,306 | 3/1983 | Linder | 414/522 |
| 4,824,158 | 4/1987 | Peters et al. | 108/44 X |
| 4,887,526 | 12/1989 | Blatt | 108/44 |

FOREIGN PATENT DOCUMENTS 1251232 12/1960 France .................................. 296/26

Primary Examiner—Eric K. Nicholson
Attorney, Agent, or Firm—James N. Videbeck

[57] ABSTRACT

A portable bed assembly for use on a pick up truck, camper, station wagon or other recreational vehicle includes an elongate framework having a width designed to fit between rear wheel wells on a motor vehicle, and a length which fits snugly within the vehicle when the rear thereof is closed. The portable bed is mounted on rollers which ride on rails mounted on the original deck or bed of the motor vehicle. The framework includes a pair of foldable leg assemblies with one mounted on each end of the portable bed assembly. A locking mechanism maintains the portable bed assembly in mounted position along the rails on the original motor vehicle bed or rear deck. When the locking mechanism is released and the rear of the motor vehicle is opened, or the tailgate is positioned horizontally, the portable bed assembly will roll outwardly of the back of the motor vehicle. The rearmost of the foldable leg assemblies may be unfolded to a vertical position when the portable bed is positioned partially out of the truck deck.

3 Claims, 4 Drawing Sheets

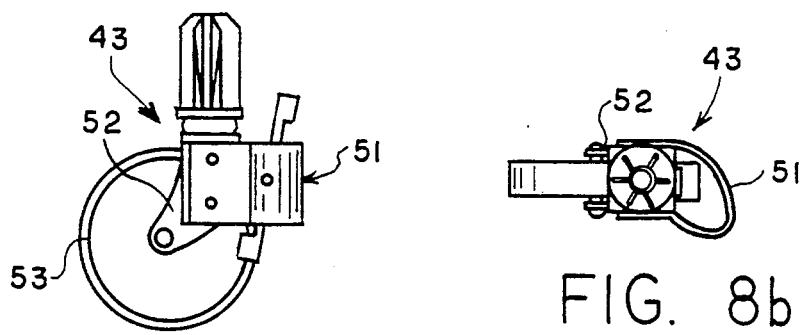
FIG. 8a
FIG. 8b
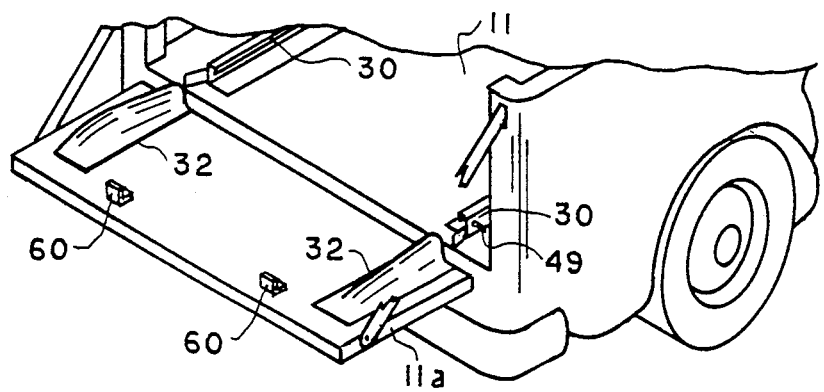
FIG. 9
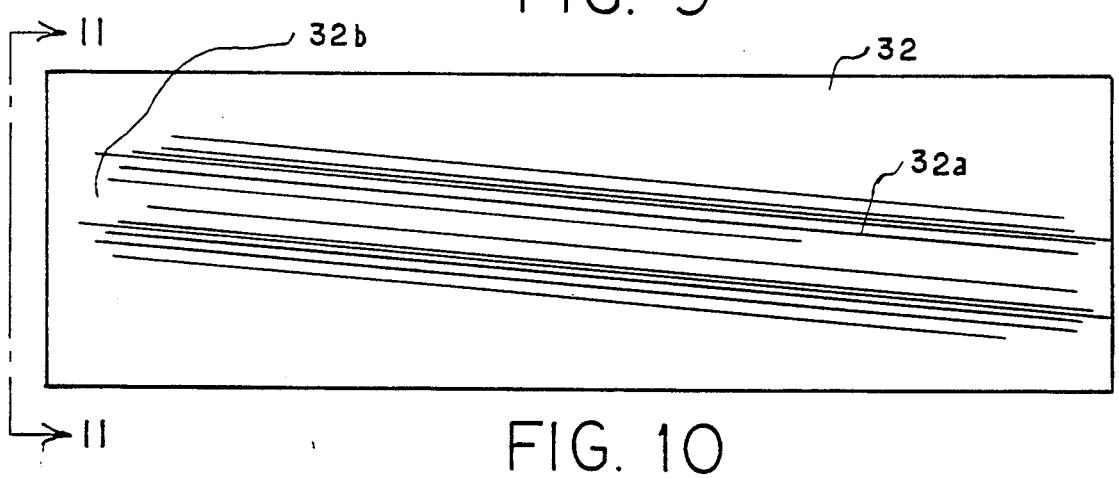
FIG. 10
FIG. 11

PORTABLE BED ASSEMBLY FOR MOTOR VEHICLES

BACKGROUND OF THE INVENTION

This invention relates to portable bed assemblies for use on motor vehicles having a rear deck or bed and, more particularly, to a free standing portable bed assembly which may be mounted on the motor vehicle or taken off thereof by a single individual.

Numerous devices have been made to aid loading and unloading materials from the rear of motor vehicles. Several of these devices have utilized sliding platforms which may be moved partially into and out of the bed of a truck or the back of a station wagon. A few of these slidable platforms have utilized one set of foldable legs positioned at the rear of the movable platform to allow the platform to stand on that free end while being supported on its inner end by the truck bed or station wagon floor. Patents which disclose these types of moveable platforms include U.S. Pat. Nos.: 2,788,137; 2,852,303; 3,028,025; 3,687,314; and 3,768,673.

While these patents disclose a slidable bed which may be moved partially out of the back of a truck or station wagon, none of these portable beds are free standing in their own right. If these portable beds are to be mounted on the vehicle by an individual, they must be picked up one end at a time, first the inner end put on the truck deck, and then the outer end picked up so as to slide the bed onto the vehicle, or else several individuals must pick up the portable bed. This type of structure makes it very difficult for a single individual to install a portable bed in such a motor vehicle, especially if any large or heavy objects are mounted on the portable bed. A need has developed for a free standing portable bed which may be mounted or dismounted from the motor vehicle by one individual without lifting either end of the portable bed more than an easily adjustable amount.

It is therefore an object of the present invention, generally stated, to provide a new and improved portable bed assembly which is slidably mountable on the bed or deck of the rear of a motor vehicle, and which may be mounted or dismounted by an individual without substantial lifting of either end of the portable bed.

It is a further object of the present invention to provide a new and improved portable bed assembly having thereon means for selectably releasably mounting foreign objects, machinery, or the like with more than one of such portable beds being interchangeably mountable on the motor vehicle bed or deck to easily switch the vehicle from use as a work vehicle to that of a recreational vehicle and vice versa.

SUMMARY OF THE INVENTION

The invention is directed to a free standing portable bed assembly for use with a rear opening, decked motor vehicle. The assembly includes a pair of elongate rails adapted for being mounted in parallel spaced relation along the length of any motor vehicle deck on which the assembly is to be mounted. An elongate framework is slidably mounted on the elongate rails and includes a plurality of rollers disposed in dual longitudinal file relation along the length of an underside of the framework for easing movement of the framework along the pair of elongate rails. Selectably releasable means for stopping sliding movement of the framework on the rails is mounted on one of the framework end rails. An improvement comprises a pair of opposed folding leg assemblies mounted transversely across the framework, with one assembly mounted adjacent each end of the underside thereof. Each assembly is foldable within the space substantially defined by the underside of the framework and the height of the roller assembly. Each folding leg assembly includes a pair of legs positioned in spaced relation transversely across the assembly, and has at least one means thereon for adjusting the length of those legs.

BRIEF DESCRIPTION OF THE DRAWINGS

The features of the present invention which are believed to be novel are set forth with particularity in the appended claims. This invention, together with further objects and advantages thereof may best be understood by reference to the following detailed description taken in conjunction with the accompanying sheets of drawings, in the several features of which like reference numerals identify like elements, and in which:

FIG. 8a is a detail elevational view of a caster wheel used in connection with the present invention;

FIG. 8b is a top plan view of the caster wheel shown in FIG. 8a;

FIG. 9 is a fragmentary perspective view of a pick up truck bed rear showing tailgate guide plates and end stops for guiding a portable bed assembly thereon;

FIG. 10 is a top plan view of a tailgate guide plate shown in FIG. 9;

FIG. 11 is a detail end elevational view of the tailgate guide plate as seen along line 11—11 of FIG. 10.

DETAILED DESCRIPTION OF THE PREFERRED EMBODIMENT

Figure 1:
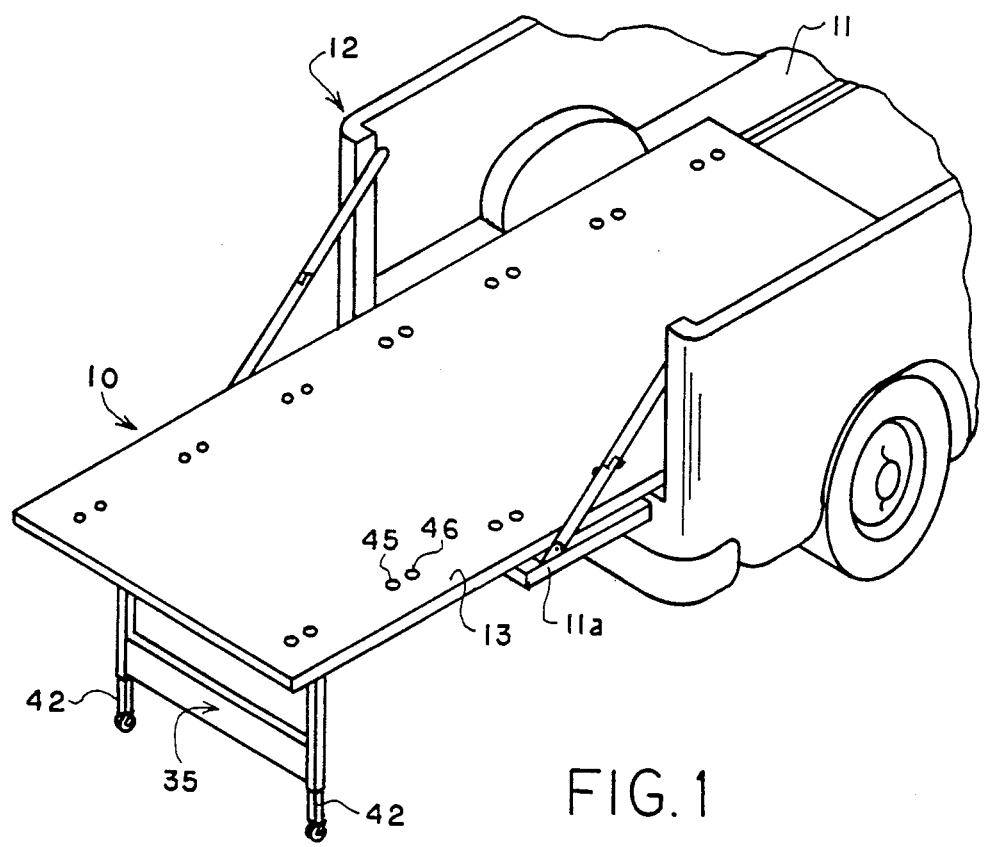
FIG. 1 is a perspective view of the portable bed assembly, constructed in accordance with the present invention, extending out of a pick up truck bed.

Referring to FIGS. 1-4, a portable bed assembly 10, constructed in accordance with the present invention, is shown as it appears slidably mounted on the rear bed or deck 11 of a pick up truck, generally indicated at 12. The portable bed 10 of the present invention includes a cover or bed member 13 which may be made of wood, particle board, metal or the like, and is mounted over a ladder-type framework, shown most clearly in FIG. 4. The ladder framework, generally indicated at 14, includes four elongate U-shape side members 15—15, a plurality of cross members 17, 18, 19 and 20, extending transversely between the side members 15—15 at the rear end, middle and leading end of the framework, respectively, and a pair of U-shape expansion members 16—16 mounted inside U-shape side members 15—15 and joining aligned ones of same in extended and contracted position, as needed for use on long bed and short bed pick-up trucks. Each side member 15—15 includes a plurality of wheel or roller mounting assemblies, generally indicated at 22—22 mounted along the length thereof, with each pair of side rail members and their expansion member 16 having seven such roller assemblies in this preferred embodiment.

Figure 2A:
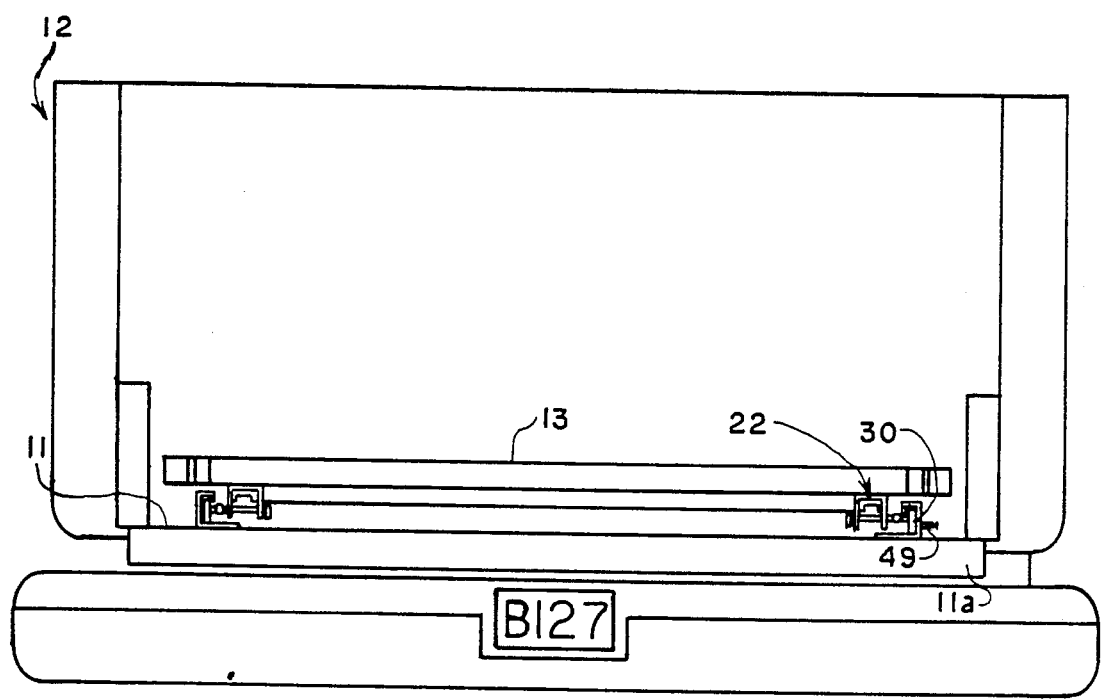
FIG. 2a is an end elevational view similar to FIG. 1 showing the portable bed assembly invention mounted on the rear deck of a pick up truck.
Figure 2B:
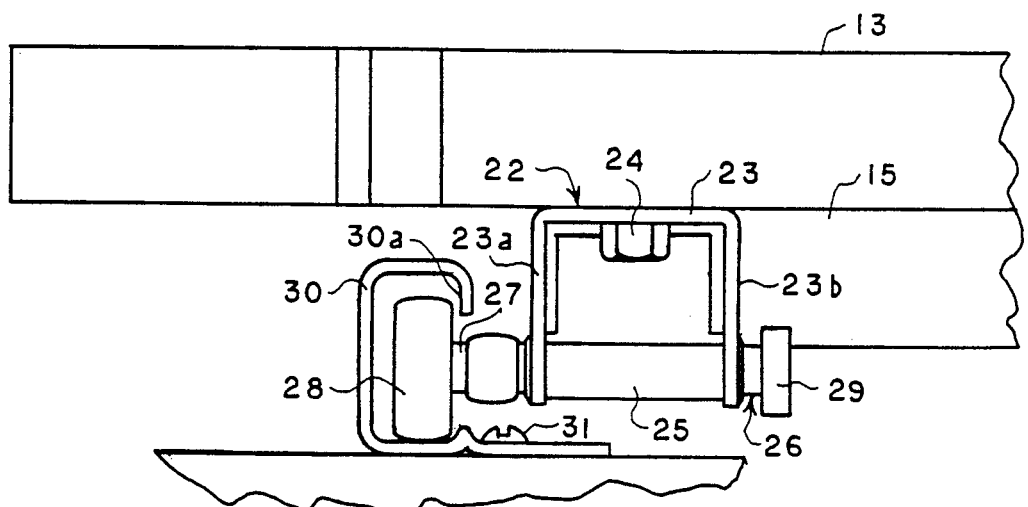
FIG. 2b is an enlarged fragmentary view of a portion of FIG. 2a showing the mounting of the rollers on the frame of the portable bed assembly and on the truck deck guide rails.

As shown most clearly in FIG. 2b, each roller or wheel assembly 22 includes a U-shaped mounting bracket 23 which is slotted (not shown) along the length of its top bight portion to allow the adjustable mounting of a pair of mounting bolts (one shown) which affixes the mounting bracket 23 to the bed cover or member 13. The spaced-apart, distal vertical portions 23a, 23b of the U-shaped mount 23 include aligned apertures therethrough in which a hollow sleeve 25 is retained. Sleeve 25 provides a mounting for a wheel-axle assembly, generally indicated at 26, including a central axle 27, a combined wheel and ball bearing 28 rotatably mounted on the central axle 27, and an axle retaining member 29 affixed to the inner end of axle 27 to maintain same in rotatable position on sleeve 25. For ease of purchase and servicing, assembly 22 may be a portion of a standard garage door-type wheel assembly. Wheel 28 in each of the 14 wheel assemblies 22—22 is slidably retained in a C-shaped channel 30—30, a pair of which are mounted in parallel spaced relation along the length of the rear deck or bed 11 on motor vehicle 12 (FIG. 2a). The downward curved distal end 30a of C-channel 30 restrains lateral motion of the wheel 28—28, and therefore maintains the framework 14 and bed cover 13 of the portable bed 10 in mounted position on the deck 11 of the motor vehicle 12. C-channels 30—30 are retained on deck 11 by means of metal screws 31, bolts, or the like.

Figure 3:
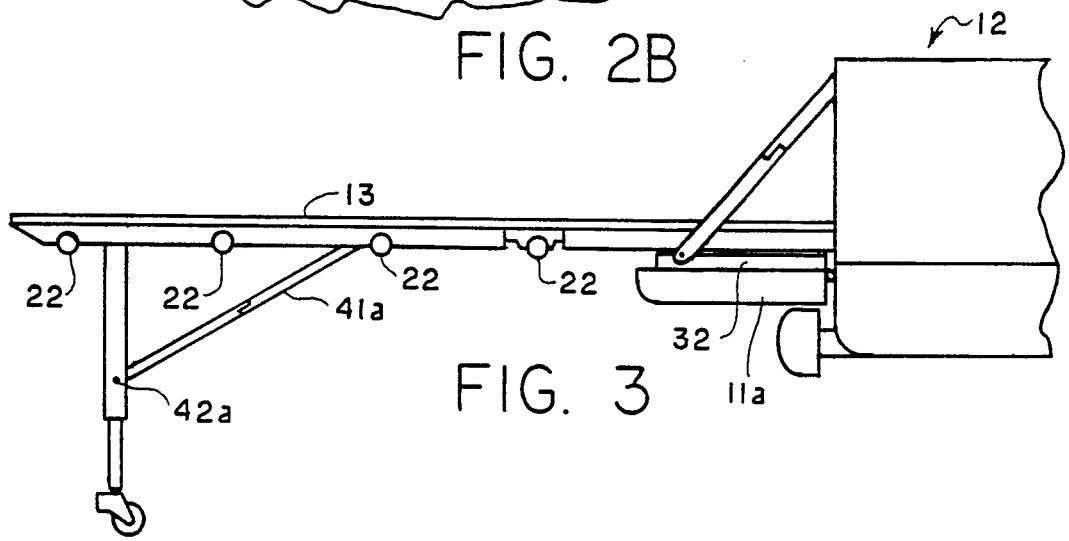
FIG. 3 is a side elevational view of the portable bed assembly shown in FIG. 1.
Figure 4:
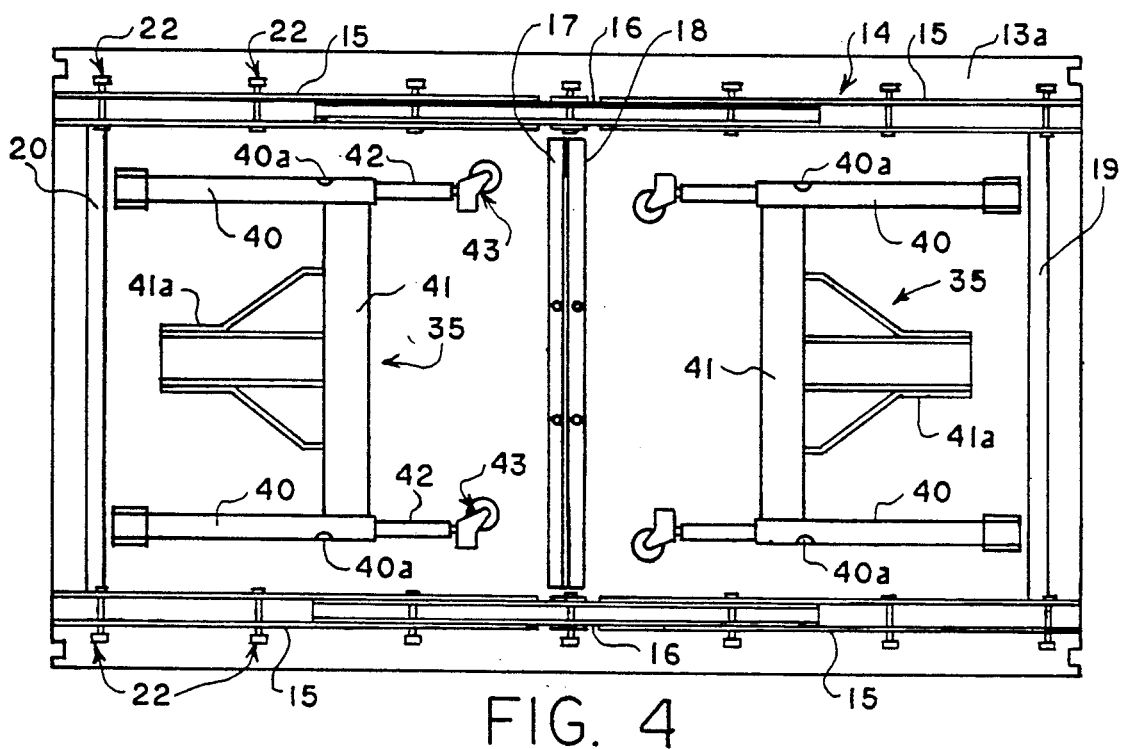
FIG. 4 is a bottom plan view of the portable bed assembly shown in FIG. 1.

Referring to FIG. 3, the motor vehicle 12 includes a pick up truck bed or rear deck 11 having a tail gate assembly 11a positioned at/the end thereof. In this embodiment, a pair of guide plates 32—32 (only one shown) are positioned on the inside of tailgate 11a so as to provide a horizontal extension of each of the C-channel members 30—30 when the tail gate is in a down position.

As shown in FIGS. 1, 3, 4 and 7, a pair of foldable leg assemblies, generally indicated at 35—35, each includes a pair of upper hinge members 36—36 mounted on the underside of bed cover 13 to provide for swinging rotational movement of the leg assembly 35 from its folded position nested in the interior of framework 14 to its unfolded vertical position. Each leg assembly 35 further includes a pair of tubular leg members 40—40 which depend perpendicularly from one of the hinges 36 while being maintained in position by a cross member 41 positioned therebetween. Dual leg extensions 42—42 adjustably extend outwardly of the open distal ends of each tubular leg portion 40—40 with each ending in a wheel or roller assembly 43—43. As shown in FIG. 3, each foldable leg assembly 35 includes a diagonally mounted locking member 41a which selectably releasably holds the assembly 35 in vertical position when it is rotated from its horizontal or folded position. As also shown in FIG. 3, each leg extension 42 includes, in this embodiment, a plurality of spring loaded detents 42a (only one shown) which are adapted to adjustably releasably maintain the leg extension at a desired position along the length of tubular leg 40 by means of biasing the detent 42a in an aperture 40a—40a (FIG. 4) in the outside of each tubular leg portion 40. The individual adjustability of leg extensions 42 in tubular leg members 40 provides a solid footing for the outer end of portable bed 10 when it is partially pulled from the deck 11 of a motor vehicle 12 as shown in FIG. 1, even when the terrain on which the vehicle is positioned is not flat.

Figure 5:
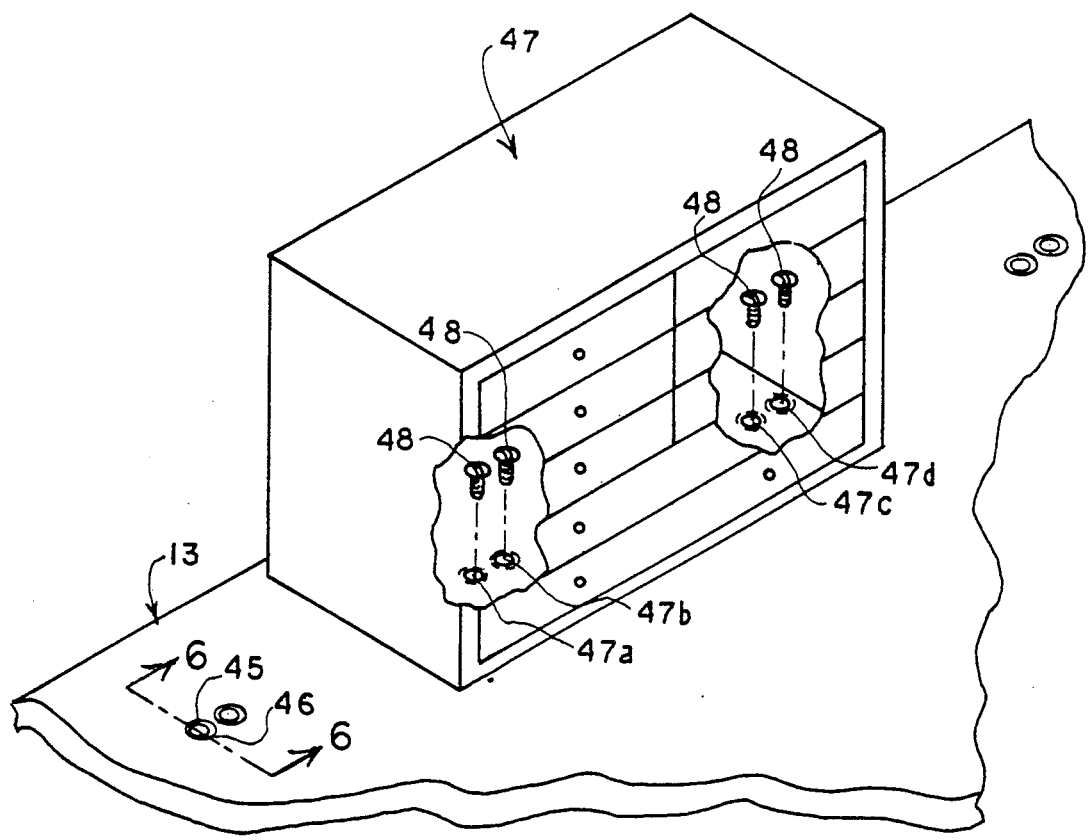
FIG. 5 is a fragmentary enlarged perspective view of a chest mounted on the portable bed member.
Figure 6:
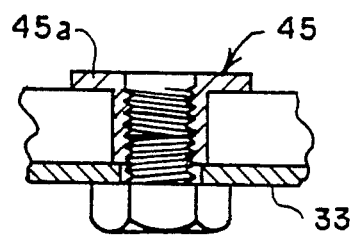
FIG. 6 is a cross sectional view of the member mounting flange taken substantially along line 6—6 of FIG. 5.

As shown most clearly in FIGS. 1, 5 and 6, the cover or bed member 13 includes a plurality of pairs of threaded tubular flange members 45—46 which are positioned in parallel dual file relation through bed member 13 along its length so as to not only provide a mounting on the under side of the bed member for each roller or wheel assembly 22, but also to provide for threaded mounting of external members on the top of bed member 13, such as tool chest 47 shown in FIG. 5. Pairs of mounting holes 47a through d may be positioned in the bottom of tool box 47, and threaded metal screws 48—48 may be utilized to permanently, or selectably releasably mount the tool box or other foreign object, in desired position on the top of bed member 13. Each tubular threaded flange member 45 includes an upper radially extending flange 45a which has barbs (not shown) on the bottom side thereof, and a tubular internally threaded central flange portion 45b which extends through an aperture in bed member 13 to be in communication with U-shaped mounting 23 of wheel assembly 22. In this embodiment, the wheel assembly 22 is maintained in position on flange 45 by means of bolt 24, which is also shown in mounted position in FIG. 2b. Tubular threaded flange members 45 and 46 may also be utilized in connection with other type mounting members such as threaded eye bolts (not shown) to provide a multitude of means for mounting external objects onto the bed member 13, either temporarily or permanently.

Figure 7:
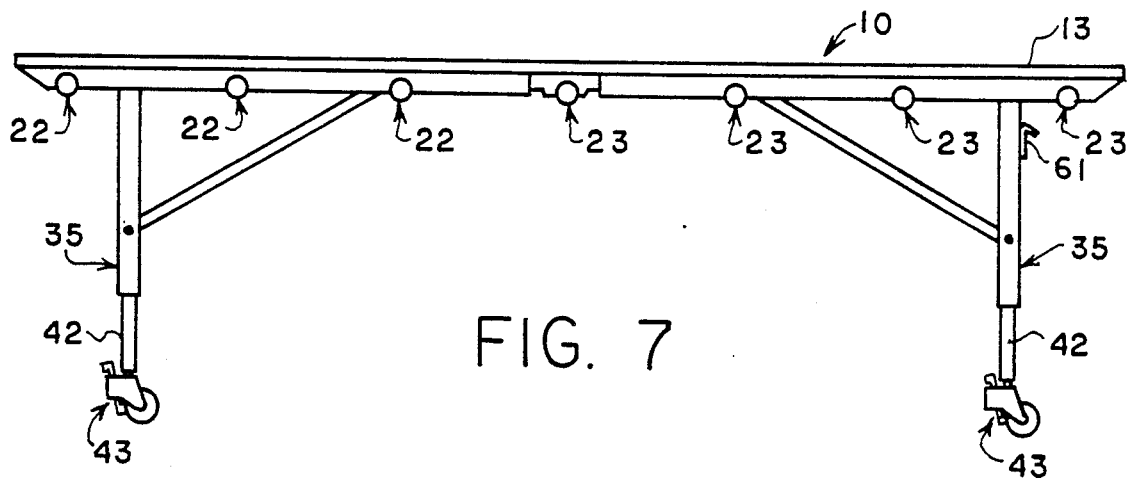
FIG. 7 is a side elevational view of the portable bed assembly of the present invention shown in free standing position.

While heretofore known portable truck bed assemblies have been slidably mounted in rear truck decks so as to be partially extendable therefrom, as shown in FIG. 1 and FIG. 3, one aspect of applicant's invention is the free standable nature of the portable bed assembly 10 such as shown in FIG. 7. With both foldable leg assemblies 35—35 vertically positioned, the bed assembly is free standing. When a user desires to position the bed assembly on the rear deck of a motor vehicle, the adjustable leg assembly 35 may each be positioned at a proper height so that the wheel assemblies 22 may be readily slid onto tailgate guide plates 32—32 and C-channels 30—30 by a single individual. Once the inner end wheel assemblies 22—22 are positioned on the guide plates 32—32, shown most clearly in FIGS. 10 and 11 and discussed in more detail below, the innermost foldable leg assembly 35 may be folded into horizontal position and the portable bed rolled or slid onto the rear deck 11 of the motor vehicle 12.

Once the portable bed assembly 10 is in the position substantially as shown in FIG. 1, the lagging or rear foldable leg assembly 35 may be collapsed horizontally within the framework 14 and under the bed member 13 to allow the entire portable bed 10 to be rolled or slid onto the motor vehicle deck 11, and tail gate 11a may be closed to retain the bed assembly in the motor vehicle 10. The portable bed assembly may be easily retained on C-channels 30—30 by means of a spring loaded pin assembly, or the like 49 positioned toward the rear of the C-channel assembly in known selectably releasable manner. Since the portable bed assembly 10 does not have to be picked up by a user in order to be positioned on the motor vehicle rear deck 11, it is easy for one individual to load or unload the bed assembly, even if that assembly has a substantial number of objects mounted thereon.

Referring now to FIGS. 8a and 8b, the caster wheel assemblies, generally indicated at 43, each include a looped cam plate 51 which extends around the caster wheel mounting bracket 52 and is affixed thereto to provide a cam surface to orient the cam wheels 53 parallel to the bottom surface 13a of bed 13 when the leg assemblies 35 are in their upwardly folded position nested between a U-shaped frame rails 15—15. As the leg assemblies are moved arcuately upward, if the caster wheel 53 impinges the underside 13a of the bed cover, the pivotable mounting at the top of the caster member 52 will arcuately move the caster wheel assembly 43 such that caster wheel 53 is somewhat parallel to the bottom surface of the bed member. However, if the forward portion of the caster wheel, without cam member 51 thereon, were to impinge the undersurface of the bed cover first, the caster wheel 53 would not automatically be positioned parallel to the undersurface of the bed cover, and would stick out downwardly and impinge on the tailgate or the bed 11 of the truck bed. The addition of cam 51 provides a means for rotating the caster wheel 53 and its associated caster member 52 when the cam 51 hits the underside 13a of bed cover 13 to rotate the wheel and caster member parallel to the undersurface 13a and thus keep the caster wheel positioned higher than the bottom of rolling wheels 28, so as to clear the tailgate 11a and truck bed 11 when mounted thereover.

Referring to FIGS. 9, 10 and 11, the tailgate guide plates 32—32 are shown in FIG. 9 in mounted position on the tailgate 11a of the truck bed 11 so as to be extensions of the C-channel members 30—30. Each guide plate 32 includes a longitudinal somewhat diagonally positioned upwardly extending ridge 32a which provides a guide for the portable bed wheel assembly 22—22 as each portable bed 10 is rolled onto the tailgate toward C-channels 30—30. The outer ends of the upwardly extending ridges 32a—32a of the guide plates 32—32, respectively, decline in their extension so as to provide a rounded outer surface 32b shown most clearly in FIG. 11, thus avoiding any sharp surface and providing aesthetics and safety to the tailgate portion of the portable bed assembly.

As also shown in FIGS. 9 and 7, a pair of L-shaped stop members 60—60 are mounted on the tailgate so as to stopingly engage complementary stop members 61—61 (only one shown) on the inwardmost leg assembly 35 of the portable bed 10 when the bed is pulled outwardly of its C-channels 30—30 to the edge of the tailgate 11a. These complementary stop members 60—61 prevent the portable bed from being pulled completely outwardly of the tailgate by accident, and allow an installer or user of the portable bed assembly to open downwardly the innermost leg assembly 35 when removing the portable bed 10 from the permanent truck bed.

One of the additional features of applicant's invention is the capability of utilizing more than one portable bed assembly 10 in connection with each motor vehicle 12. For example, a multi-faceted service business could utilize a plurality of portable bed assemblies, each having tools or machines mounted thereon for use with one facet of the services provided by the business. In the same manner, an individual may utilize tools and machinery being permanently mounted on one portable bed assembly, and recreational, camping equipment, or the like being utilized on a second portable bed assembly, with switches of the assemblies easily being made on the weekends or at other times when vacation or camping trips are desired by a user.

Thus, a free standable portable bed assembly has been shown and described in connection with its structure and mounting in a motor vehicle having a rear deck or bed. While one embodiment of the present invention has been shown and described, it will be understood by those skilled in the art that changes and modifications may be made without departing from the invention in its broader aspects. Therefore, the aim in the appended claims is to cover all such changes and modifications as may fall within the true spirit and scope of the present invention.

The invention is claimed as follows:

1. A free standing portable bed assembly for use with rear opening decked motor vehicles comprises:
    a pair of elongated rails adapted for being mounted in parallel spaced relation along the length of a motor vehicle deck on which said assembly is to be mounted,
    an elongated framework slidably mountable on said elongate rails including a plurality of roller means disposed in dual longitudinal file relation along the length of an underside of said framework for easing movement of said framework along said pair of elongate rails,
    selectably releasable means on one of said elongate rails and said elongate framework for stopping sliding movement therebetween,
    a pair of opposed folding leg assemblies mounted transversely across said framework, one assembly mounted adjacent each end of the underside of said framework, each assembly being foldable within a space substantially defined by the underside of said framework and the height of said roller means, each folding leg assembly including a pair of legs positioned in spaced relation transversely across said assembly, and including at least one means thereon for adjusting the length of said legs on said assembly, and
    a pair of frame rail guides adapted for being mounted on a motor vehicle tailgate on which said bed assembly is to be mounted.

2. A free standing portable bed assembly for use with rear opening decked motor vehicles comprises:
    a pair of elongated rails adapted for being mounted in parallel spaced relation along the length of a motor vehicle deck on which said assembly is to be mounted,
    an elongated framework slidably mountable on said elongate rails including a plurality of roller means disposed in dual longitudinal file relation along the length of an underside of said framework for easing movement of said framework along said pair of elongate rails,
    selectably releasable means on one of said elongate rails and said elongate framework for stopping sliding movement therebetween,
    a pair of opposed folding leg assemblies mounted transversely across said framework, one assembly mounted adjacent each end of the underside of said framework, each assembly being foldable within a space substantially defined by the underside of said framework and the height of said roller means, each folding leg assembly including a pair of legs positioned in spaced relation transversely across said assembly, and including at least one means thereon for adjusting the length of said legs on said assembly, and threaded flanged nuts extending through said bed member for receiving bolts at the bottom thereof for mounting said roller means in connection with said framework, and for receiving bolts at the top thereof for mounting foreign objects on the top of said bed member.

3. A free standing portable bed assembly for use with rear opening decked motor vehicles comprises:

a pair of elongated rails adapted for being mounted in parallel spaced relation along the length of a motor vehicle deck on which said assembly is to be mounted, an elongated framework slidably mountable on said elongate rails including a plurality of roller means disposed in dual longitudinal file relation along the length of an underside of said framework for easing movement of said framework along said pair of elongate rails, selectably releasable means on one of said elongate rails and said elongate framework for stopping sliding movement therebetween, a pair of opposed folding leg assemblies mounted transversely across said framework, one assembly mounted adjacent each end of the underside of said framework, each assembly being foldable within a space substantially defined by the underside of said framework and the height of said roller means, each folding leg assembly including a pair of legs positioned in spaced relation transversely across said assembly, and including at least one means thereon for adjusting the length of said legs on said assembly, and each folding leg assembly includes a pair of caster wheel assemblies with each including cam means for substantially horizontally positioning each caster wheel when said folding leg assembly is in folded position.

* * * * *